July 28, 1925.

G. L. FISH

VALVE

Filed March 1, 1923

1,547,494

INVENTOR
GEORGE L. FISH.

BY Dewey, Strong
Townsend and Loftus

ATTYS.

Patented July 28, 1925.

1,547,494

UNITED STATES PATENT OFFICE.

GEORGE L. FISH, OF LONG BEACH, CALIFORNIA.

VALVE.

Application filed March 1, 1923. Serial No. 622,102.

*To all whom it may concern:*

Be it known that I, GEORGE L. FISH, a citizen of the United States, residing at Long Beach, county of Los Angeles, and State of California, have invented new and useful Improvements in a valve, of which the following is a specification.

This invention relates to a valve and especially to that type which is employed for the purpose of injecting fuel oil under high pressure into the cylinder of internal combustion engines and the like.

The object of the present invention is to generally improve and simplify the construction and operation of valves of the character described. I accomplish this object by providing a structure in which leakage is practically eliminated; by arranging the movable parts so that friction is materially reduced, thereby permitting the valve to be operated with a minimum of power; by providing a valve which oscillates on its seat and automatically takes up wear; by eliminating the usual form of stuffing box and by constructing the valve as a separable unit of an operating stem.

One form which my invention may assume is exemplified in the following description and illustrated in the accompanying drawings, in which—

Figure 1:
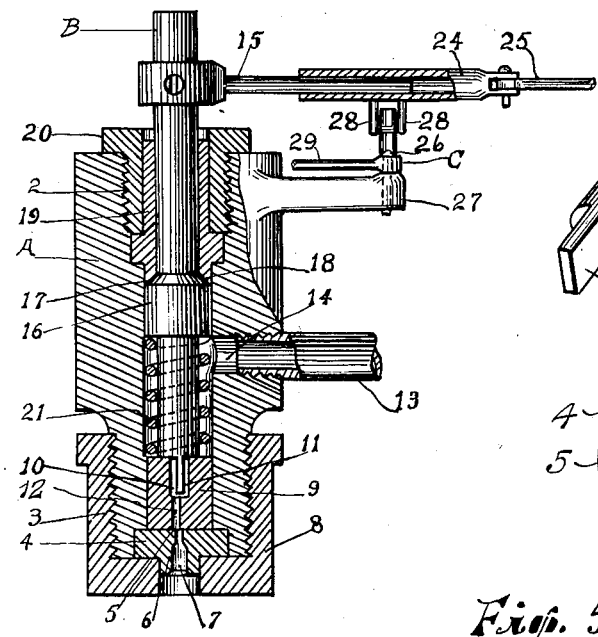
Fig. 1 is a central, vertical, longitudinal section through the valve.
Figure 3:
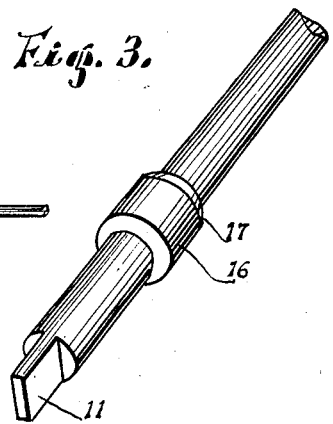
Fig. 3 is a perspective view of the valve stem.
Figure 2:
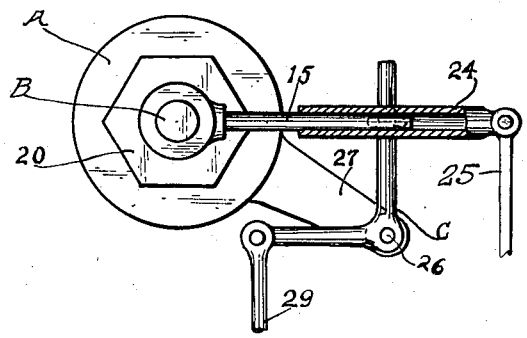
Fig. 2 is a plan view thereof partly in section.
Figure 6:
Fig. 6 is a perspective view of the valve seat.

Referring to the drawings in detail, and particularly to Figs. 1 and 2, A indicates a valve casing which is substantially cylindrical in cross section as shown in Fig. 2. Formed interior of the casing is a central bore or passage which is enlarged and internally threaded at the upper end as indicated at 2. The lower end of the bore is also enlarged as indicated at 3 and an annular shoulder is thus formed which receives and supports a removable valve seat member generally indicated at 4. The valve seat member is centrally perforated to form a spray opening 5, and the lower end of the valve seat member terminates in a spray tip 6 in which the spray opening is enlarged as indicated at 7. The removable valve seat is secured to the main valve casing by means of a threaded cap as indicated at 8 and as such may be readily removed for inspection, repairs, renewal or otherwise.

Figure 5:
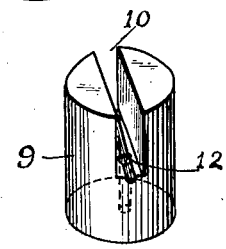
Fig. 5 is a perspective view of the valve.

Positioned in the bore of the valve and directly above the valve seat member 3 and engaging the same is a valve 9, see Figs. 1 and 5. The upper end of the valve is slotted, as shown at 10, to receive the flattened portion 11 of the valve stem generally indicated at B. The valve proper is elongated and cylindrical in cross section and the slotted portion is perforated or drilled slightly off center, as indicated at 12, to form a passage which may be turned into or out of register with the spray tip openings 5 and 6. The oil or other fuel to be sprayed is delivered to the casing by means of a pipe 13. The oil thus delivered enters a passage 14, which communicates with the main bore and it then travels downwardly exterior of the valve stem B and therefore exerts its pressure on top of the valve 9, thus retaining it in forcible engagement with the seat member 3.

The flattened end 11 of the valve stem is smaller than the slot 10 into which it projects and as such forms a passage through which the oil enters the opening 12, and when this opening is turned into register with the spray openings 5 and 7 a free flow of oil and discharge thereof is permitted as will hereinafter be described. The valve stem B projects through the upper end of the valve casing A and carries a lever 15 on its upper end through which an oscillating movement is transmitted to the valve stem and the valve 9. The lower end of the valve stem is enlarged to form a collar 16, the upper edge of which is bevelled as indicated at 17. This bevelled edge engages a bevelled seat 18 formed on the lower end of a removable stuffing gland 19 which is secured within the casing A by means of a threaded nut 20. The gland 19 serves two functions, first that of a guide or bearing for the valve stem, and secondly that of a packless gland, that is, a spring 21 is placed between the upper end of the valve 9 and the shoulder 16 on the valve stem, thus forcing the bevelled edge 17 of the collar into contact with the bevelled seat 18 of the gland. This forms a tight joint between the gland and the stem and as such eliminates the use of any packing and furthermore reduces friction to a minimum. The tension of the spring is also exerted against the valve 9 and it is, therefore, held in contact with the seat, thereby avoiding leakage around and in under the valve when high pressures are exerted. Engagement of the valve stem with its seat and the valve 9 with the seating member 3 is furthermore taken care of when oil under pressure is admitted as the pressure of the oil or fuel employed is exerted on the upper end of the valve 9 and the lower face of the collar 16; thus further insuring seating of the collar and the valve to prevent leakage.

The valve here shown is particularly adapted for injecting fuel oil under high pressure into cylinders of Diesel engines and the like. Means are, therefore, provided for intermittently oscillating the valve stem and the valve to open and close communication with the spray passages 5 and 7. Means are also provided for increasing or decreasing the amount of oil sprayed by adjusting the stroke of the lever 15. This is accomplished by employing a telescoping lever 24, (see Figs. 1 and 2). The outer end of this lever is connected to a rod 25 which is connected with some moving part of the engine. Such moving part usually has a fixed movement and the rod 25 may, therefore, be considered as a movable part having predetermined or fixed movement, but as it is desirable to increase or decrease the oscillating movement of the valve and the valve stem, it is obvious that some adjustment is required. Such adjustment is obtained by moving the telescoping lever 24 with relation to the lever 15. When the telescoping lever is moved outwardly, the oscillating movement is decreased and when it is moved inwardly, the oscillating movement is increased. The means employed in this instance is a bell crank generally indicated at C, pivotally supported as at 26 on a lug or other bearing 27 forming a part of the valve casing A. One end of the bell crank projects between a pair of pins 28 extending downwardly from the lever 24, while the opposite end of the bell crank is connected to a rod 29 which is manually operated in some instances or actuated by a governor or the like in other instances.

In actual operation fuel oil under high pressure is introduced through the pipe 13. The oil thus introduced enters the passage 14 and then travels downwardly through the annular passage 14$^a$ formed between the valve casing bore and the valve stem B. The oil then enters the slot 10 and the discharge opening 12 formed therein, and as this opening moves into and out of register with the spray openings 5 and 7, it is obvious that an intermittent discharge will be obtained and that the amount of fuel discharged intermittently may be regulated by moving the discharge port or opening 12 only into partial register with the spray opening 5. When partial register is maintained, the amount of fuel discharged is lessened and when an increase of fuel is required, complete registration of the ports or spray openings may be obtained by adjusting the position of the levers 15 and 24, either automatically or through manual control.

Figure 4:
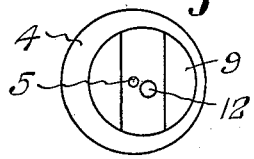
Fig. 4 is a diagrammatic view of the valve and the seat against which it operates.

The movement of the valve 9 and the stem B, as previously stated, is an oscillating movement and it is for this reason that the discharge port 12 formed in the valve is placed slightly off center. As this is the case, it is obvious that the valve seat member must be eccentric to the main valve casing bore or that the bore must be eccentric to the valve seat. In this instance the valve casing bore is slightly eccentric to the valve seat as diagrammatically illustrated in Fig. 4, and turning or oscillating movement transmitted to the valve 9 will, therefore, insure registration of the ports or spray openings when desired. The valve is intermittently operated in certain instances, or it may be permanently opened when a continuous discharge is desired. In other words, I do not wish to limit myself to a valve, the operation of which is always intermittent as it is obvious that a continuous discharge may also be obtained when desired.

A valve constructed as here shown may be operated with a minimum of power as the movement, first of all, is very slight to insure registration of the ports or spray passages, and secondly, because stuffing boxes of the usual type are entirely eliminated. In fact the only friction to which the valve stem is subjected is that produced between the stem and the seat 18, and that produced between the end of the valve and the valve seat member 3. This friction is very slight and the amount of power required to operate the valve is, therefore, proportionately small. Wear does not effect the operation of the valve here shown as considerable longitudinal movement of the valve stem with relation to the valve is permitted, or vice versa, that is, continuous oscillating movement under high pressure will tend to wear away the seat 18, and similarly the face of the valve 9. This wear is, however, taken up due to the fact that longitudinal movement is permitted and also due to the fact that the parts are always maintained in engagement with their respective seats because of the interposition of the spring 21.

While certain features of the present invention are more or less specifically illustrated, I wish it understood that various changes in form and proportion may be resorted to within the scope of the appended claims, similarly that the materials and finish of the several parts employed may be such as the experience and judgment of the manufacturer may dictate or various uses may demand.

Having thus described my invention, what I claim and desire to secure by Letters Patent is—

1. In a valve of the character described, a valve member having a discharge passage formed therein, and a seat therefor also having a discharge passage formed therein, the discharge passage in the valve being eccentric therein, the valve being also eccentric with relation to the valve seat, and the discharge passage in the valve seat being central therein.

2. In a valve of the character described, a valve member having a discharge passage formed therein, a seat therefor also having a discharge passage formed therein, the discharge passage in the valve being eccentric therein, the valve being also eccentric with relation to the valve seat, and the discharge passage in the valve seat being central therein, and means for transmitting a turning movement to the valve to bring the discharge passage therein into or out of register with the discharge passage in the seat member.

3. In a valve of the character described, a casing having a longitudinal bore formed therein, a valve seat member forming a closure for one end of the bore and having a central spray passage formed therein, a valve turnably mounted in the bore and having one end disposed in engagement with the seat member, a longitudinal discharge passage formed in the valve and eccentrically positioned with relation to the valve, said valve being also eccentrically positioned with relation to the seat, and means for transmitting a turning movement to the valve to bring the passage therein into or out of register with the spray passage in the valve seat member.

4. A valve comprising a casing having a longitudinal bore formed therein, a removable valve seat member adapted to be secured in one end of the bore, means for securing the valve seat member against removal, said valve seat member also having a central spray passage formed therein, a valve fitting the bore and so disposed that its end engages the valve seat member, a discharge opening formed in the valve and eccentrically positioned and extending longitudinally through the valve, said valve being also eccentrically positioned with relation to the valve seat, a slot in the upper end of the valve, a valve stem disposed in the bore of the valve, and having a flattened portion extending into the slot, a valve seat member formed on the stem, a sleeve secured in the bore through which the stem extends and having a seat formed in one end to engage the valve seat portion of the stem, and means for transmitting a turning movement to the valve stem.

5. A valve comprising a casing having a longitudinal bore formed therein, a removable valve seat member adapted to be secured in one end of the bore, means for securing the valve seat member against removal, said valve seat member also having a central spray passage formed therein, a valve fitting the bore and so disposed that its end engages the valve seat member, a discharge opening formed in the valve, eccentrically positioned and extending longitudinally through the valve, said valve being also eccentrically positioned with relation to the valve seat, a slot in the upper end of the valve, a valve stem disposed in the bore of the valve and having a flattened portion extending into the slot, a valve seat member formed on the stem, a sleeve secured in the bore through which the stem extends and having a seat formed in one end to engage the valve seat portion of the stem, and a spring interposed between the valve seat portion of the stem and the valve proper.

6. In a valve of the character described, a valve seat member having a central discharge passage formed therein, a valve engageable with the seat and eccentrical therewith, said valve having a discharge passage formed therein which is eccentrically positioned in the valve, means for transmitting an oscillating movement to the valve to bring the passages into and out of register with each other, and means for adjusting the stroke of the oscillating movement.

7. In a valve of the character described, a valve seat member having a central discharge passage formed therein, a valve engageable with the seat and eccentric therewith, said valve having a discharge passage formed therein which is eccentrically positioned in the valve, means for transmitting an oscillating movement to the valve to bring the passages into and out of register with each other, said means comprising a valve stem, a lever on the stem, a telescoping lever carried by the first-named lever, means for transmitting a fixed oscillating movement to the telescoping lever and the first-named lever, and means for telescoping one lever with relation to the other.

8. A valve of the character described comprising a casing having a longitudinal bore formed therein, a cylindrical shaped valve in the bore and disposed in one end thereof, said valve having a longitudinal passage formed therein and connecting the end faces of the valve, said passage being eccentric within the valve, a valve seat member engageable with one of said end faces and having a central passage formed therein, said valve and seat being also eccentrically positioned with relation to each other, and means for transmitting a turning movement to the valve about its longitudinal axis.

GEORGE L. FISH.